Patented July 25, 1950

2,516,351

UNITED STATES PATENT OFFICE 2,516,351

MODIFIED PHENOLIC RESIN COATING COMPOSITIONS

Jerome S. Stanford, Springfield, and Eli Perry, Indian Orchard, Mass., assignors to Monsanto Chemical Company, St. Louis, Mo., a corporation of Delaware No Drawing. Application November 29, 1945, Serial No. 631,797

8 Claims. (Cl. 260—44)

This invention relates to coating compositions. More specifically this invention relates to phenolic resins modified with alkyd-aromatic sulfonamide resin compositions.

It is known to modify phenolic resins with alkyd resins especially to improve the flexibility of coatings made therefrom. However, the increase in flexibility is gained at the expense of the outstanding chemical resistance of the phenolic resins.

It is also known to use aromatic sulfonamide resins to plasticize phenolic resins resulting in increasing weather resistance of the composition but such compositions have not come into general use because of their softness and solubility in organic solvents.

It is an object of this invention to provide a modified phenolic resin coating composition.

A further object is to modify a phenolic resin without substantially lowering the chemical and solvent resistance of the product.

Another object is to provide coating compositions from phenolic resins and alkyd resins modified with aryl sulfonamide resins.

These and other objects are attained by incorporating an alkyd-aryl sulfonamide resin composition into a soluble phenolic resin with the aid of organic solvents.

The following examples are given in illustration and are not intended to limit the scope of this invention. Where parts are mentioned they are parts by weight.

Example I 1000 parts of a 60% solids ethanol solution of a phenol-cresol-formaldehyde resin were mixed with 65 parts of an alkyd-p-toluene sulphonamide-formaldehyde resin composition, 560 parts of ethanol and 560 parts of toluene. The resulting solution was coated on a steel plate, dried in air at a slightly elevated temperature to remove volatile solvents and then cured at about 350 F. for 30 minutes. A hard flexible coating was obtained which was resistant to non-oxidizing acids, strong alkalies, and common organic and inorganic compounds including solvents. It did not soften when heated at 600° F. and had excellent weather resistance.

The phenol-cresol-formaldehyde resin was prepared by reacting a phenol-cresol mixture with Formalin (37% formaldehyde) in the molar ratio of 1 mol of a phenol-cresol mixture containing 60 parts of phenol and 40 parts of cresol to 1.25 mols of formaldehyde. Ammonium hydroxide was used as a condensation catalyst and the reaction was carried out to the "B" or soluble, fusible stage.

Example II 1000 parts of a 60% solids ethanol solution of a phenol-formaldehyde resin were mixed with 60 parts of a toluene sulfonamide-formaldehyde-alkyd resin, 500 parts of ethanol and 500 parts of xylol. The resulting solution was coated on a steel plate, and the solvent was allowed to evaporate. The resultant coating cured at about 350° F. in about 30 minutes. The cured coating was hard, tough, and showed excellent chemical and weather resistance.

The phenolic resin was made by condensing phenol with Formalin (37% formaldehyde) in the presence of triethanolamine as a condensation catalyst. The molar ratio of phenol to formaldehyde was 1 to 1.15 and the condensation was carried part way through the "B" stage. The resin was still soluble and fusible when dissolved in the ethanol.

The alkyd-sulfonamide-aldehyde resins of this invention are produced by reacting an alkyd resin with the condensation product of an aryl sulfonamide and an aldehyde. The alkyd component may be the reaction product of a polyhydric alcohol, preferably a dihydric alcohol, with a polycarboxylic acid. Dihydric alcohols such as ethylene glycol, propylene glycol, butylene glycol or glycol ethers such as diethylene glycol may be used. Mixtures of dihydric alcohols may be used or mixtures of dihydric alcohols with other polyhydric alcohols such as glycerol may be used. Various polycarboxylic acids or their anhydrides such as phthalic, succinic, maleic, adipic, citric, fumaric, sebacic acids and their anhydrides, may be reacted with the above named dihydric alcohols or dihydric alcohol mixtures to form the alkyd component of the alkyd-sulfonamide-aldehyde resin. The alkyd resin may be further modified before reaction with the sulfonamide-aldehyde resin by the use of fatty acids such as oleic acid, linseed oil acids, etc. natural resins such as kauri, copal, dammar, rosin and drying or non-drying oils such as linseed oil, perilla oil, soybean oil, castor oil, etc.

Any of the aromatic sulfonamides such as ortho, meta, or para toluene sulfonamide, phenyl sulfonamide, xylyl sulfonamide, etc. may be reacted with an aldehyde to form the second component of the modifying resin. The aldehyde may be formaldehyde, acetaldehyde, furfural or aldehyde producing compounds such as paraldehyde, hexamethylene tetramine etc. The alkyd-aryl sulfonamide-aldehyde resins are more fully described in U. S. Patent 2,187,199.

The phenolic resins of this invention may be classified as the alcohol soluble condensation products of one or more phenols with an aldehyde, prepared in the presence of an alkaline catalyst.

The phenolic component may be a monohydric phenol such as phenol itself, cresol or xylenol, a mixture of monohydric phenols or a mixture of a monohydric phenol with a polyhydric phenol such as resorcinol, pyrogallol, etc. The amount of formaldehyde used may be varied considerably as long as more than one mol of formaldehyde is used for each mol of phenolic component. For example, it may vary from 1:1.1 to 1:1.5. Other aliphatic aldehydes such as acetaldehyde may replace the formaldehyde in whole or in part. The condensation catalyst may be any alkaline reacting catalyst, preferably a volatile compound such as ammonia or one of the alcohol amines. The preliminary condensation reaction must always be carried out to the "B" stage but the resin may be advanced part way through the "B" stage to increase the speed of cure of the final product. Care must be taken to stop the reaction while still within the limits of complete solubility of the resin in alcohols.

The amount of alkyd-sulfonamide-aldehyde resin to be mixed with the phenolic resin may be varied to suit individual requirements. As little as 5 parts will toughen 100 parts of phenolic resin markedly and as much as 15 parts may be used without softening or materially affecting the superior chemical resistance of the phenolic resins.

Various conventional additives may be used such as pigments, dyes, etc.

The coating compositions of this invention may be cured by heat alone without addition of curing catalysts. Various acids or acid reacting catalysts may be used but tend to reduce the chemical and weather resistance of the resultant films. The temperature of the cure may be varied from about 300 to about 425° F. with a consequent variation in the time of cure from about 1 hour at 300° F. to about 5 minutes at 425° F.

This invention makes it possible to produce tough, flexible films having all the superior qualities of chemical resistance shown by phenolic compounds without the defects inherent in such compounds such as brittleness and poor weather resistance.

The foregoing description is given in illustration and is not intended to limit this invention as set forth in the appended claims.

What is claimed is:

1. A coating composition comprising an alcohol-soluble, heat-convertible phenolic resin prepared by condensing under alkaline conditions formaldehyde with a member of the group consisting of monohydric phenols, mixtures of monohydric phenols and mixtures of monohydric phenols with polyhydric phenols, the molar ratio of formaldehyde to total phenolic component being greater than 1:1, and from 5 to 15% by weight based on the phenolic resin of a soluble, fusible reaction product of an alkyd resin obtained by reaction of phthalic anhydride and a mixture of polyhydric alcohols of which the predominant constituents are dihydric alcohols, a phthalate ester of a monohydric alcohol which is compatible with said alkyd resin, and a condensation product of an aromatic sulfonamide with formaldehyde.

2. A coating composition as in claim 1 wherein the aromatic sulfonamide is toluene sulfonamide.

3. A coating composition as in claim 1 wherein the phenolic resin is a phenol-formaldehyde resin.

4. A coating composition as in claim 1 wherein the phenolic resin is a phenol-formaldehyde resin and the aromatic sulfonamide is toluene sulfonamide.

5. An article carrying a coating comprising an alcohol-soluble, heat-convertible phenolic resin prepared by condensing under alkaline conditions formaldehyde with a member of the group consisting of monohydric phenols, mixtures of monohydric phenols, and mixtures of monohydric phenols with polyhydric phenols, the molar ratio of formaldehyde to total phenolic component being greater than 1:1, and from 5 to 15% by weight based on the phenolic resin of a soluble, fusible reaction product of an alkyd resin obtained by reaction of phthalic anhydride and a mixture of polyhydric alcohols of which the predominant constituents are dihydric alcohols, a phthalate ester of a monohydric alcohol which is compatible with said alkyd resin, and a condensation product of an aromatic sulfonamide with formaldehyde, said coating composition having been cured to the insoluble, infusible state after application to said article.

6. An article as in claim 5 wherein the phenolic resin is a phenol-formaldehyde resin.

7. An article as in claim 5 wherein the aromatic sulfonamide is toluene sulfonamide.

8. An article as in claim 5 wherein the phenolic resin is a phenol-formaldehyde resin and the aromatic sulfonamide is toluene sulfonamide.

JEROME S. STANFORD.
ELI PERRY.

REFERENCES CITED

The following references are of record in the file of this patent:

UNITED STATES PATENTS

| Number | Name | Date |
|---|---|---|
| 1,443,935 | Weisberg | Jan. 30, 1923 |
| 1,650,109 | Bender | Nov. 22, 1927 |
| 2,187,199 | Gardner et al. | Jan. 16, 1940 |

OTHER REFERENCES

Baekeland: Ind. and Eng. Chem., Mar. 1909, page 155.

"Plasticizers and Resins," pages 28–31, revised May 1940, Monsanto Chemical Co., St. Louis.